(12) United States Patent
Oyman et al.

(10) Patent No.: US 8,553,796 B2
(45) Date of Patent: *Oct. 8, 2013

(54) DISTORTION-AWARE MULTIPLE INPUT MULTIPLE OUTPUT PRECODING

(75) Inventors: Ozgur Oyman, San Jose, CA (US); Jeffrey R. Foerster, Portland, OR (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/800,265

(22) Filed: May 12, 2010

(65) Prior Publication Data
US 2011/0150113 A1    Jun. 23, 2011

Related U.S. Application Data

(63) Continuation-in-part of application No. 12/655,091, filed on Dec. 23, 2009.

(51) Int. Cl.
*H04B 7/02* (2006.01)
(52) U.S. Cl.
USPC .......................................... 375/267; 375/299
(58) Field of Classification Search
USPC ................................. 375/267, 299, 347, 349
See application file for complete search history.

(56) References Cited

U.S. PATENT DOCUMENTS

| | | | |
|---|---|---|---|
| 2003/0165189 A1 | 9/2003 | Kadous | |
| 2005/0063314 A1* | 3/2005 | Sahinoglu et al. | 370/252 |
| 2006/0176972 A1* | 8/2006 | Kim et al. | 375/267 |
| 2007/0206695 A1 | 9/2007 | Ye et al. | |
| 2007/0217538 A1 | 9/2007 | Waxman | |
| 2008/0080632 A1 | 4/2008 | Kim et al. | |
| 2008/0101494 A1 | 5/2008 | Kotecha et al. | |
| 2008/0159203 A1* | 7/2008 | Choi et al. | 370/328 |
| 2011/0150111 A1 | 6/2011 | Oyman et al. | |

FOREIGN PATENT DOCUMENTS

| | | |
|---|---|---|
| KR | 10-2006-0043799 A | 5/2006 |
| KR | 10-2009-0101773 A | 9/2009 |
| WO | 2011/087614 A2 | 7/2011 |
| WO | 2011/087614 A3 | 11/2011 |

OTHER PUBLICATIONS

International Search report and Written Opinion received for PCT Application No. PCT/US2010/058799, mailed on Aug. 26, 2011, 9 pages.
International Preliminary Report on Patentability and Written Opinion received for PCT Application No. PCT/US2010/058799, mailed on Jul. 5, 2012, 6 pages.
Office Action received for U.S. Appl. No. 12/655,091, mailed on Jun. 7, 2012, 24 pages.
Office Action received for U.S. Appl. No. 12/655,091, mailed on Jan. 16, 2013, 26 pages.

* cited by examiner

*Primary Examiner* — Emmanuel Bayard
(74) *Attorney, Agent, or Firm* — Forefront IP Lawgroup, PLLC

(57) ABSTRACT

Precoding parameters used for precoding of a source are selected to minimize distortion that would otherwise be induced in the source during encoding and transmission of the source over a multiple input multiple output (MIMO) channel.

20 Claims, 8 Drawing Sheets

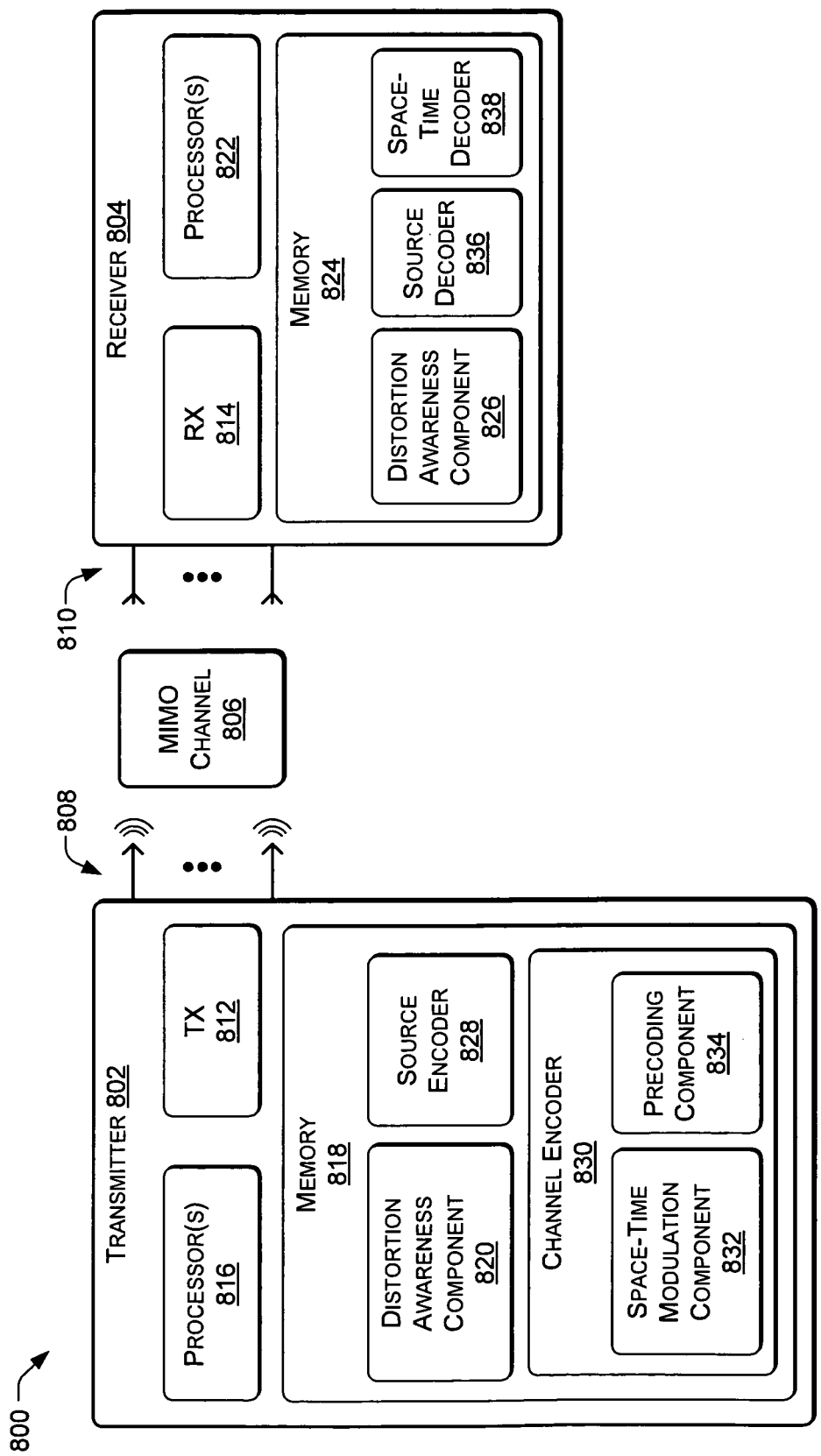

DISTORTION-AWARE MULTIPLE INPUT MULTIPLE OUTPUT PRECODING

CROSS-REFERENCE TO RELATED APPLICATION

This application is a continuation-in-part of and claims priority to U.S. patent application Ser. No. 12/655,091, filed Dec. 23, 2009, the entire disclosure of which is incorporated herein by reference.

BACKGROUND

Wireless communication technology has evolved from a technology offering mainly voice service to a technology that also provides multimedia content. Recent advances in mobile computing and wireless communications enable transmission of rich multimedia content over wireless networks. One such advance is the use of MIMO (Multiple Input Multiple Output) communications in which multiple antennas are used at both the transmitter and the receiver for increasing data throughput without requiring additional bandwidth. Further, while MIMO configurations are usually optimized to maximize data transmission rates, with the increased demand for various different services at the application layer, achieving high reliability in addition to high data transmission rates at the physical layer (PHY) has become ever more important. However, high data rates and high reliability tend to be conflicting design parameters.

Typical wireless communications involve the transmission of a continuous source over a noisy channel. Common examples are speech communications, multimedia communications, mobile TV, mobile video and broadcast streaming. In such communications, the source is encoded and compressed into a finite stream of bits, and the bit stream is then communicated over the noisy channel. Source coding is carried out to convert the continuous source into a finite stream of bits, and channel coding is performed before transmission to mitigate the errors in the bit stream that will be introduced by the noisy channel. At the receiver end, a channel decoder recovers the bit stream from its noisy version, and a source decoder reconstructs the multimedia source from the recovered compressed version. During transmission of a multimedia communication, minimizing distortion between the original multimedia source and the reconstructed version at the receiver can provide a better multimedia experience for a user.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 8 depicts a block diagram of an example distortion-aware communication system according to some implementations.

DETAILED DESCRIPTION

Distortion-Aware Link Adaptation with Precoding

Some implementations herein provide a distortion-aware MIMO (Multiple Input Multiple Output) communication system that minimizes end-to-end distortion of transmissions. For example, some implementations provide for MIMO link adaptation for enhancing multimedia communications and optimizing end-to-end robustness of multimedia content delivery in order to provide a multimedia experience with less distortion than conventional systems. Some implementations herein present design criteria for selecting MIMO precoding parameters in order to minimize end-to-end distortion through distortion-aware precoding design. Precoding according to these implementations is a processing technique that exploits channel state information (CSI) by operating on the signal before transmission. Subject to power constraints, precoding may be performed to ensure that the transmit signal has a desirable structure (e.g., covariance) to optimize certain performance metrics. Typically, these metrics have included capacity, pair-wise error probability, symbol error rate and signal-to-noise ratio (SNR). Implementations herein provide a framework for an optimal precoding design in order to support distortion-aware link adaptation techniques.

During precoding some implementations select a beamforming matrix for orthogonal transmit beam directions and power allocation across these beams based on distortion minimizing considerations. Thus, the distortion-aware arrangements herein can provide enhanced multimedia communications for optimizing end-to-end robustness of multimedia content (e.g., mobile video) delivery in order to enable an improved user experience. For example, based on distortion-minimizing selection criteria, implementations provide "distortion-aware" precoding guidelines for selecting power allocation strategies across MIMO transmit beams for different kinds of statistical CSI (e.g., channel mean, channel correlation structure, and the like). Consequently, implementations herein provide for adaptive modulation and coding (AMC), MIMO space-time modulation, rate/power adaptation, precoding and antenna selection techniques subject to one or more end-to-end distortion minimization criteria.

Figure 1:
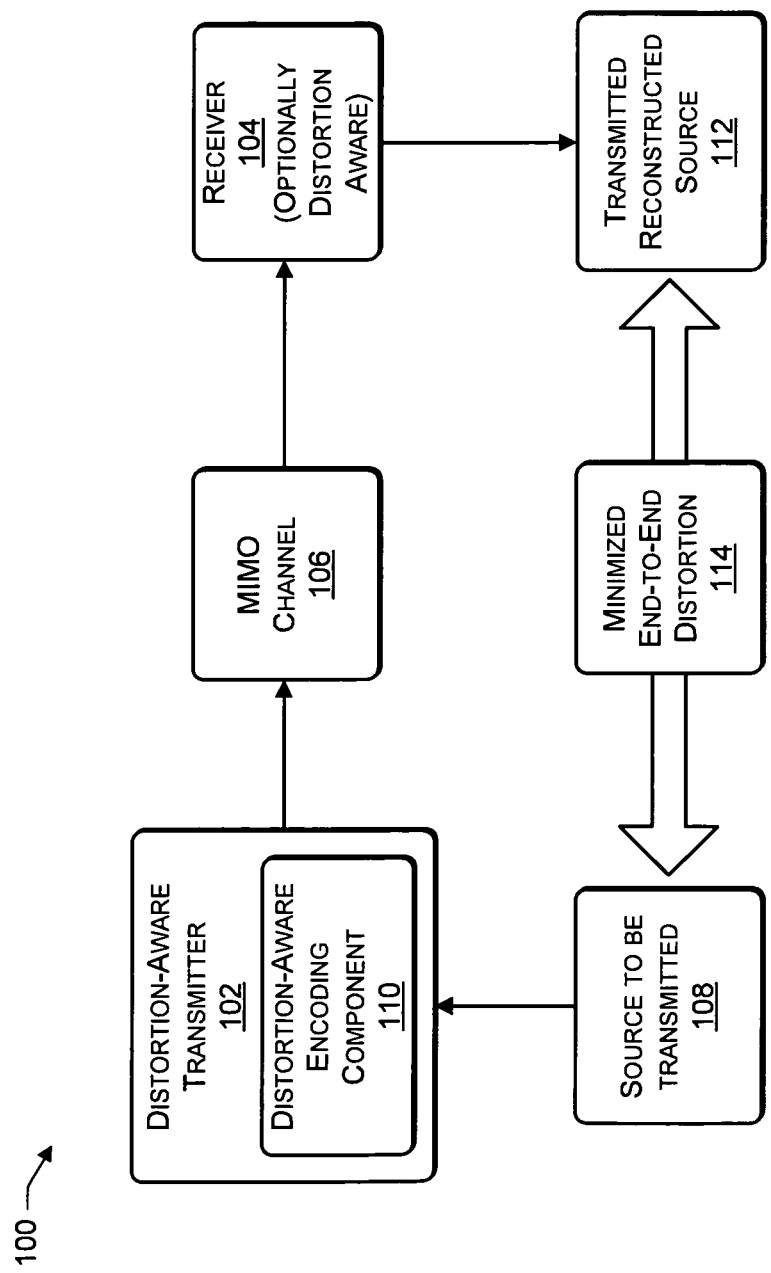
FIG. 1 depicts a block diagram of an example distortion-aware communication system according to some implementations disclosed herein.

FIG. 1 illustrates an example block diagram of a communication system 100 according to some implementations herein. System 100 includes a distortion-aware transmitter 102 able to communicate with a receiver 104 through a MIMO channel 106. The distortion-aware transmitter 102 is configured to receive a source to be transmitted 108. A distortion-aware encoding component 110 at the distortion-aware transmitter 102 encodes the source prior to transmission based on distortion minimizing considerations. Thus, the transmitter 102 is able to take into account distortion minimizing link adaptation parameters and then transmit the encoded source over the MIMO channel to the receiver 104.

The receiver 104 is configured to receive the MIMO transmission and reconstruct the transmission to generate a transmitted reconstructed source 112.

Because the distortion-aware transmitter 102 takes distortion minimizing parameters into consideration during encoding of the source, the system is able to achieve minimized end-to-end distortion 114 between the source to be transmitted 108 and the transmitted reconstructed source 112, thereby providing improved communications for transmitting multimedia items and the like. Optionally, the receiver 104 may also be distortion-aware and provide feedback to the transmitter 102 for enabling the transmitter 102 to be distortion aware. For example, the receiver 104 may determine precoding criteria and other link adaptation parameters to minimize end-to-end distortion. The receiver 104 can provide these parameters as feedback to the transmitter 102, which then uses the provided parameters. In this optional configuration, distortion-aware transmitter 102 may also send the rate-distortion characteristics of the source to receiver 104, so that the distortion-aware receiver 104 can utilize this information in determining the precoding and other link adaptation parameters to achieve the minimized end-to-end distortion 114.

Figure 2:
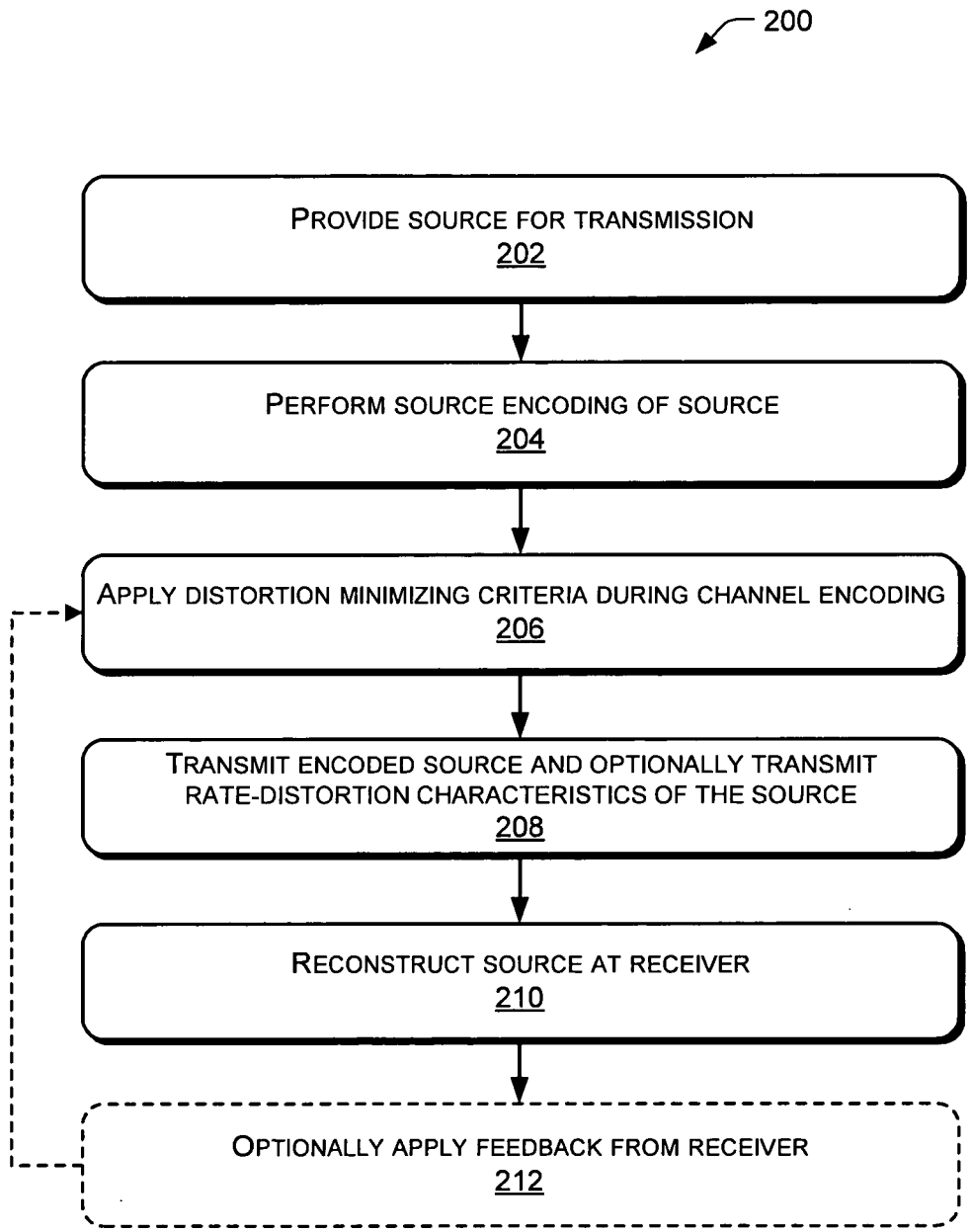
FIG. 2 depicts a flow diagram of an example process for distortion-aware communications according to some implementations.

FIG. 2 illustrates a flow diagram of an example process 200 corresponding to the implementation of FIG. 1. In the flow diagram, the operations are summarized in individual blocks. The operations may be performed in hardware, or as processor-executable instructions (software or firmware) that may be executed by one or more processors. Further, the process 200 may, but need not necessarily, be implemented using the system of FIG. 1. Consequently, by way of explanation, and not limitation, the process 200 is described in the context of the system of FIG. 1.

At block 202, a source is provided to a transmitter for transmission. For example, the source may be a continuous or finite source, such as a multimedia communication, e.g., voice over IP, speech and audio communications, mobile TV, mobile video services, or the like. Implementations herein may apply to multimedia communications over wireless local area networks (WLANs), wireless personal area networks (WPANs), wireless wide area networks (WWANs) and wireless metropolitan area networks (WMANs). Moreover, implementations may include cellular networks, mobile broadband networks, satellite broadcasting systems and terrestrial broadcasting systems. For example, implementations can be used in 802.11-based LANs (e.g., the IEEE 802.11 standard, IEEE std., 802.11-2009, published Oct. 29, 2009, or future implementations thereof) 802.15-based PANs (e.g., the IEEE 802.15 standard, IEEE std., 802.15-2006, published September 2006, or future implementations thereof) and 802.16-based WANs (e.g., the IEEE 802.16 standard, IEEE std., 802.16-2009, published 2009, or future implementations thereof) where MIMO technologies have been adopted and it is desirable to reliably communicate multimedia content. Implementations can also be used for MIMO in 3G networks, 4G networks, cellular networks, WWANs, 3GPP networks, LTE networks, LTE-Advanced networks, and Mobile TV, and the like. Further, while several specific standards have been set forth herein as examples of suitable applications, implementations herein are not limited to any particular standard or protocol.

At block 204, source coding is carried out by the transmitter, such as to convert the continuous source into a finite stream of bits.

At block 206, distortion minimizing criteria are applied during encoding by the transmitter. By incorporating distortion-minimizing parameters during the encoding it is possible to mitigate the errors in the bit stream that would otherwise be induced by transmission over the channel. For example, according to some implementations, optimal MIMO modulation-and-coding schemes, packet sizes and precoding parameters are selected for minimizing distortion that will occur to the source during encoding, transmission and decoding.

At block 208, the encoded source is transmitted to the receiver over the MIMO channel. Along with the encoded source, the rate-distortion characteristics of the source may optionally be transmitted over the MIMO channel so that this information may be used by the receiver toward distortion-aware link adaptation.

At block 210, the receiver receives the transmission from the transmitter and decodes the transmission to reconstruct the source.

At block 212, optionally, the receiver can provide feedback to the transmitter to provide the transmitter with information pertaining to the distortion-minimizing parameters. The feedback may include the distortion-minimizing precoding parameters and other link adaptation parameters, such as a MIMO modulation-and-coding scheme and packet size, or may include other information for enabling the transmitter to determine the distortion minimizing parameters. When the transmitter receives the feedback, the corresponding distortion minimizing parameters can be applied to the channel encoding.

Source and Channel Coding

As source and channel coding operations are performed at different communication layers, many conventional communication systems implement the source coding entirely separately from the channel coding. That is, source coding may be performed without taking into account the channel behavior and channel coding may be performed without considering the nature of the source. In general, multimedia wireless communication involves transmitting analog sources over fading channels while satisfying end-to-end distortion and delay specifications of an application. For example, delay-limitedness accounts for the presence of stringent latency and buffer constraints. Accordingly, separation of source and channel coding may not be optimal, such as when the channel state information (CSI) is not available at the transmitters or when finite coding blocklengths are used due to practical system limitations.

Some implementations herein adopt a joint source-channel coding technique for providing MIMO link adaptation. In the joint source-channel coding according to implementations herein, the source compression and channel coding are performed jointly, such that the end-to-end distortion for wireless multimedia communication can be minimized by accounting for the impact of both source distortion (e.g., due to lossy compression) and channel-induced distortion (e.g., due to fading and noise).

MIMO Communications

As mentioned above, multiple-input multiple-output (MIMO) wireless communication uses multiple antennas at both ends of a point-to-point wireless link. The use of MIMO systems can improve spectral efficiency, link reliability and power efficiency through spatial multiplexing gain, diversity gain and array gain, respectively. Two practical techniques for space-time modulation in MIMO systems are transmit diversity and spatial multiplexing. "MIMO diversity" refers to a family of techniques (e.g., space-time coding (STC)) that attempt to spread information across transmit antennas to enable robust transmission and substantial reliability and coverage improvement in the presence of fading. "MIMO Spatial multiplexing" (MIMO SM), on the other hand, refers to a form of spatial modulation that achieves high data rates by dividing the incoming data into multiple substreams and transmitting each substream on a different antenna, enabling transmission rate growth dependent, at least in part, upon the number of transmit and receive antennas. A receiver removes the mixing effect of the channel and demultiplexes the symbol stream. A MIMO system can benefit from both MIMO diversity and MIMO SM. As a general rule, at low signal-to-noise ratios (SNRs), it is preferable to use MIMO diversity techniques and at high SNRs it is preferable to use MIMO SM. Adaptive switching between MIMO diversity and MIMO SM based on the knowledge of the long-term and/or short-term channel fluctuations at the transmitter enables the highest possible gains from MIMO techniques in terms of spectral efficiency and reliability. Apart from adaptive switching between MIMO diversity and MIMO spatial multiplexing, MIMO link adaptation techniques herein also include MIMO precoding and MIMO antenna selection.

Distortion-Aware MIMO Link Adaptation

The inventors herein have determined that there is a tradeoff between resolution at the source encoder and robustness at the channel encoder. Accordingly, limiting source distortion and associated quantization errors uses a high-rate source code, for which the multiple antennas of the MIMO channel are used mainly for multiplexing. Alternatively, the source can be encoded at a lower rate with more distortion, and then the channel error probability and associated packet error rate (PER) can be reduced through increased diversity. Consequently, some distortion-aware MIMO link adaptation implementations provided herein take this tradeoff into consideration toward optimizing end-to-end multimedia communications over MIMO wireless networks.

Typically, MIMO link adaptation aims to maximize the link throughput, goodput or spectral efficiency, which is achieved when the selected MIMO modulation and coding scheme (MIMO MCS) transmission mode provides the highest spectral efficiency based on the channel conditions. Furthermore, packet sizes, i.e., the total number of information bits carried in a given transmission packet, may also be adapted based on the channel conditions. With large packet sizes, it may be possible to send more information bits over the channel in a given packet transmission, but in such settings more packet errors are likely to be encountered compared to transmissions with smaller packet sizes. Consequently, given channel state information, it is possible to predict the packet error rate of all available MIMO MCS modes and packet sizes and choose the MIMO MCS mode and packet size which offers the highest spectral efficiency. Therefore, MIMO link adaptation typically aims to maximize goodput (also known as throughput) given by the following formula:

$$goodput = \tilde{R} * (1 - PER)$$

such that $$(MIMO\_MCS, P\_SIZE, Q) = \arg \max_{MIMO\_MCS, P\_SIZE, Q} \tilde{R} * (1 - PER),$$

where $\tilde{R}$ is the space-time transmission rate at the channel coder determined by the selected MIMO-MCS scheme (including FEC type and code rate, modulation order, MIMO space-time modulation scheme), P_SIZE is the packet size and PER is the packet error rate (PER) determined by the average or long-term received signal-to-interference-and-noise ratio (SINR), instantaneous or statistical knowledge of the short-term SINR over the MIMO channel, selected MIMO MCS, selected packet size and selected precoding matrix Q.

Instead of attempting to maximize goodput, implementations herein provide MIMO link adaptation techniques for minimizing an expected value of end-to-end distortion by choosing the MIMO MCS, packet size and precoding matrix Q using the following distortion-based criterion (referred to as distortion-aware MIMO link adaptation):

$$(MIMO\_MCS_{SELECTED}, P\_SIZE_{SELECTED}, Q_{SELECTED}) = \arg \min_{MIMO\_MCS, P\_SIZE, Q} D_{ave}(MIMO\_MCS, P\_SIZE, Q)$$

where $D_{ave}$(MIMO_MCSP_SIZE,Q) represents the average end-to-end distortion for a given MIMO MCS, packet size and precoding matrix Q. In other words, the selection of MIMO MCS, packet size, precoding matrix Q and MIMO space-time modulation mode (e.g., MIMO diversity or MIMO SM) for the multimedia transmission is decided according to implementations herein so that the resulting end-to-end distortion $D_{ave}$(MIMO_MCS, P_SIZE, Q) is minimized.

For the MIMO diversity mode (e.g., MIMO STC, MIMO OTSBC, etc.) as well as single-input single-output (SISO) systems, the average end-to-end distortion at data rate R is given by the formula $$D_{ave}(MIMO\_MCS\_DIV, P\_SIZE, Q) = D(b*R)*(1-PER) + D_{max}*PER$$

For the MIMO SM mode with vertical encoding, where a total of N spatial streams are sent simultaneously over the MIMO link using a single space-time-frequency encoder for all N spatial streams, with each spatial stream sent at data rate R, the average end-to-end distortion is given by the formula $$D_{ave}(MIMO\_MCS\_SM, P\_SIZE, Q) = D(N*b*R)*(1-PER) + D_{max}*PER.$$

In the case of a MIMO vertical encoding architecture with a linear receiver (e.g., zero-forcing (ZF) or minimum mean square-error (MMSE) receiver) followed by a single space-time-frequency decoder, the packet error rate (PER) is dictated by the quantity $SINR_{min} = \min_n SINR_n$, such that $SINR_n$ is the signal-to-interference-and-noise ratio (SINR) corresponding to the n-th multiplexed MIMO spatial stream (n=1, ..., N).

For the MIMO SM mode with horizontal encoding, where a total of N spatial streams are sent simultaneously over the MIMO link using a separate time-frequency encoder that is associated with each of the N spatial streams, with each spatial stream sent at data rate R, the average end-to-end distortion is given by the formula $$D_{ave}(MIMO\_MCS\_SM, P\_SIZE, Q) = \sum_{n=0}^{N} D(n*b*R) \left( \sum_{K_n} \prod_{k:b_k=1} (1 - PER_k) \prod_{l:b_l=0} PER_l \right)$$

where $PER_n$ is the packet error rate for the n-th multiplexed MIMO spatial stream (n=1, ..., N), and for $\{b_n \in \{0,1\}\}_{n=1}^{N}$, then $$K_n = \left\{ (b_1, \ldots, b_N) : \sum_{k=1}^{N} b_k = n \right\},$$

after observing that, for the MIMO horizontal encoding architecture, each of the N spatial streams is encoded and decoded independently.

In the above equations, D(b*R) represents a distortion-rate function for a multimedia source, i.e., the distortion that the source incurs after reconstruction at the decoder (due to quantization errors associated with lossy compression by the multimedia codec) as a function of the data rate R determined by the selected MIMO MCS, $D_{max}$ is the maximum possible distortion experienced when the source reconstruction at the decoder is hindered by packet losses and transmission failures, given by $D_{max}=D(R=0)$, and b is a fixed scalar normalization term representing the ratio between the source code rate and channel code rate to account for the rate matching between the multimedia codec and the channel coder. For example, some implementations assume delay-limited multimedia traffic which cannot be buffered due to tight latency constraints. The distortion-rate function D(b*R) is a decreasing function of the data rate R, since a higher source/channel code rate allows for compression with lower quantization errors and hence lower distortion. The rate-distortion characteristics may also be dependent on other application and network layer functionalities, such as frame type (e.g., I-frame, P-frame or B-frame), employed error concealment scheme, network layer packetization and transmission framework used toward passing the compressed source from the codec to the channel encoder (e.g., in RTP/UDP), type of layering in the case of advanced source compression methods such as scalable video coding (SVC) and application-layer forward error correction FEC (e.g., raptor codes, Reed-Solomon codes, etc.).

In a slow-fading environment, a burst of error would significantly degrade error performance and thus negatively impact the reliable decoding of the received signal. If the system can tolerate a certain delay, retransmitting the signal using Automatic repeat request (ARQ) protocols would help to enhance communication reliability. The main objective of an ARQ protocol is to prevent, for each link, the loss of frames due to transmission errors. Frame errors are examined at the receiving end by an error detection (usually cyclic redundancy check (CRC)) code. If a frame passes the CRC, the receiving end sends an acknowledgement (ACK) of successful transmission to the receiver. If a frame does not pass CRC and the receiver node detects errors in the received frame, it sends a negative acknowledgement (NACK), requesting retransmission. The request is repeated until the decoder detects an error-free transmission. User data and CRC bits may be additionally protected by an error correcting code which increases the probability of successful transmission. In Hybrid ARQ (HARQ) protocols, error detection and correction are combined in order to obtain better reliability and throughput. Distortion-aware link adaptation techniques may be designed to accommodate ARQ or HARQ based retransmission mechanisms. For instance, in the MIMO diversity mode (e.g., MIMO STC, MIMO OTSBC, etc.) as well as single-input single-output (SISO) systems, the average end-to-end distortion at data rate R is given by formula (1), can be revised as follows:

$$D_{ave}(MIMO\_MCS\_DIV, P\_SIZE, Q) =$$
$$D(bR)*(1-PER_1) + D(bR/2)*PER_1*$$
$$(1-PER_2) + \ldots D(bR/M)*\left(\prod_{j=1}^{M-1} PER_j(1-PER_M) + D_{max}\prod_{j=1}^{M} PER_j\right)$$

where $PER_j$ is the probability of packet decoding error after the j-th transmission, and M is the maximum number of allowed transmissions.

Selection of the MIMO modulation and coding scheme (MIMO-MCS) herein includes (a) selection of the modulation order, (b) selection of the forward error correction (FEC) type and coding rate, and (c) determination of which space-time modulation techniques will be used. Options for space-time modulation include spatial multiplexing (SM), space-time coding (STC), orthogonal space-time block coding (OSTBC), beamforming, etc., including metrics such as STC rate, rank, number of MIMO streams, and the like. Special cases for multi-antenna communications, such as single-input-multiple-output (SIMO) modes can also be used among space-time modulation options. Further, the MIMO link adaptation herein may be employed in conjunction with any distortion-rate function, and implementations may include any method for incorporating distortion criteria in the appropriate selection of a MIMO MCS.

Furthermore, the selection of the precoding matrix Q herein includes (a) beamforming to convert a MIMO channel into an equivalent single-input single-output (SISO) channel, (b) precoded spatial multiplexing, (c) precoded orthogonal space-time block coding (OSTBC), (d) transmit power allocation and covariance optimization, and (e) transmit antenna selection techniques where M out of $M_t$ transmit antennas are selected for transmission.

Implementations of the distortion-aware MIMO link adaptation criterion allow for realizing the benefits of joint source-channel coding by adapting the source and channel coding rate to minimize end-to-end distortion, rather than maximize throughput or spectral efficiency. It should be noted that in order to use this distortion-based MIMO link adaptation criterion, only the distortion-rate function D(b*R) may be available at the radio level (which is determined by the nature of the multimedia source as well as the compression capabilities of the codec or source encoder), so this information can be passed from the application layer to the PHY/MAC (physical/media access control) layer. It should be further noted that the above MIMO link adaptation criterion may be employed in conjunction with any distortion-rate function or any function of rate that quantifies the user's quality of experience for the multimedia application, and that implementations herein also include any method for incorporating distortion criteria or any other criteria that determine multimedia quality in the appropriate selection of a MIMO MCS, packet size and precoding matrix.

Open Loop and Closed Loop MIMO Link Adaptation

Figure 3:
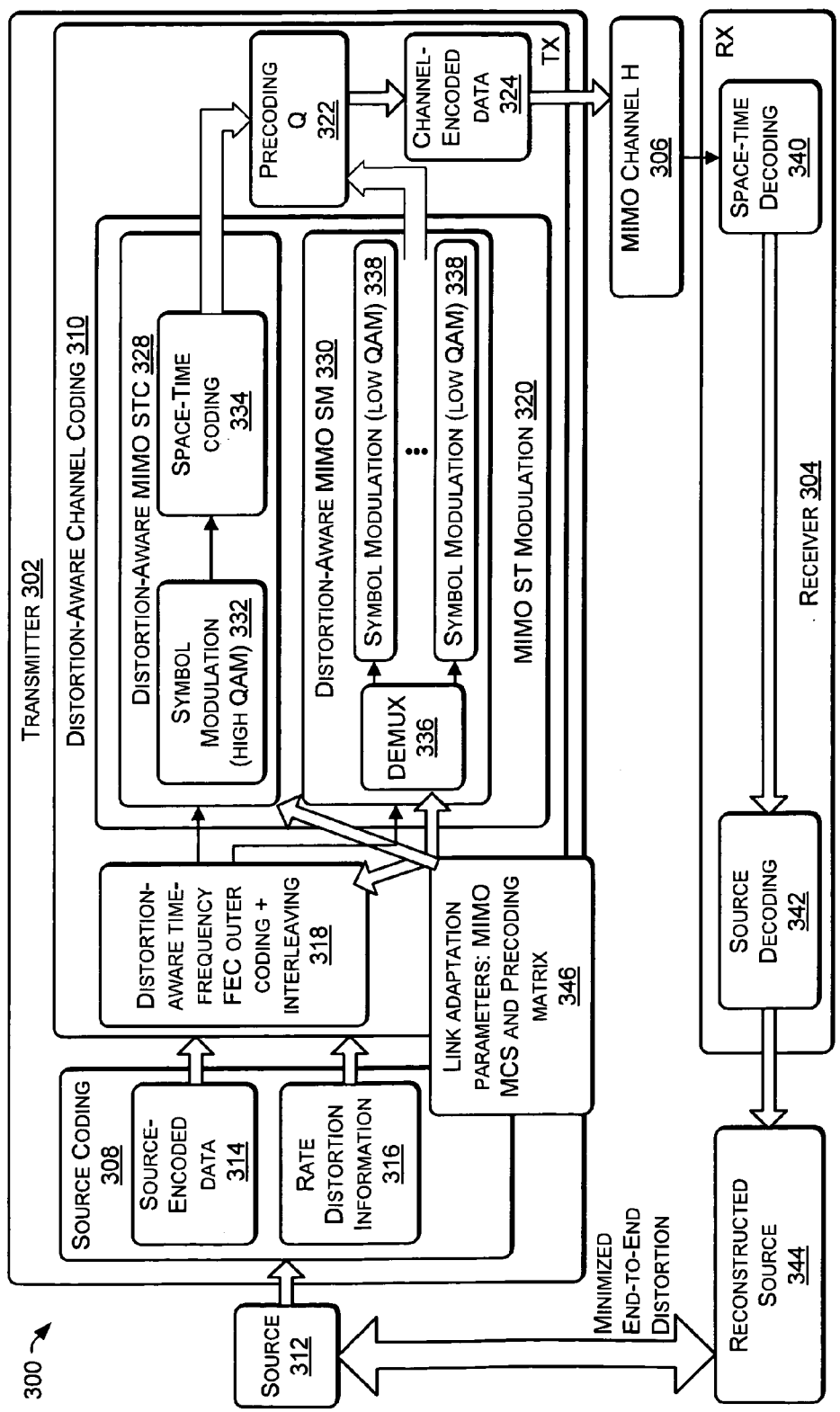
FIG. 3 depicts a block diagram of an example open loop system according to some implementations.

Implementations of the distortion-aware MIMO link adaptation framework are applicable for both open-loop and closed-loop MIMO systems. The system architectures for the transmitter and receiver components are depicted in FIG. 3 for an open-loop MIMO communication configuration, and in FIG. 4 for a closed-loop MIMO communication configuration having limited rate feedback of link adaptation parameters. The open-loop MIMO setup may be more relevant for scenarios in which reliable estimation and feedback of dynamic channel variations and link adaptation parameters is generally difficult (e.g., as in high mobility scenarios), so the distortion-aware MIMO link adaptation can be performed at the transmitter based on the knowledge of the long-term channel variations and statistics of the instantaneous or short-term channel variations. On the other hand, the closed-loop MIMO setup may be more relevant for situations where the channel variations occur over a slower time scale (e.g., as in low-mobility scenarios) to allow for reliable channel estimation and feedback of link adaptation parameters from the receiver to the transmitter (i.e., using mechanisms such as a channel quality indicator (CQI) feedback mechanism). The closed-loop MIMO configuration may also use statistical or long-term channel knowledge in communication scenarios where link adaptation parameters are determined by the receiver and fed back to the transmitter, for instance, as in the uplink of cellular communications, where it is difficult to obtain reliable estimates of the instantaneous or short-term channel conditions for various reasons such as high mobility or high user density.

Open-Loop Architecture

FIG. 3 illustrates a block diagram of an example of an open-loop distortion-aware MIMO link adaptation architecture 300 according to some implementations herein, in which link adaptation parameters are determined and applied at the transmitter. In the architecture of FIG. 3, a transmitter 302 is able to communicate with a receiver 304 via a MIMO channel H 306. In the illustrated implementation, transmitter 302 includes a source encoder, shown as source coding block 308, and a channel encoder, shown as channel coding block 310. The source coding block 308 is configured to compress or otherwise encode a source 312, such as a multimedia source, to create source-encoded data 314, and pass the source-encoded data 314 along with rate-distortion information 316 of the source-encoded data 314 to the channel coding block 310. For example, in the case that source 312 is a video received by source coding block 308 as a stream of video information, source coding block 308 encodes (e.g., compresses) the received stream of video information into a format suitable for transmission (one non-limiting example of a suitable format is the H.264/MPEG-4 AVC video coding standard developed by the ITU-T Video Coding Experts Group (VCEG) together with the ISO/IEC Moving Picture Experts Group (MPEG), finalized May, 2003, or the like). Furthermore, in the case in which the source 312 is an analog stream, source coding block 308 further converts the analog stream into a digital form during encoding. Finally, the source coding block 308 may be configured to compress or otherwise encode a source 312 and create source-encoded data 314 with a selected source coding rate that matches the MCS determined by the channel coding block 310 subject to the distortion-aware criteria for MIMO MCS selection, as discussed herein.

Consequently, the encoding carried out by the source coding block 308 is at least partially dependent upon the nature of the multimedia source as well as the compression capabilities of the codec or source encoder. Further, according to implementations herein, rate distortion information 316 is determined for the encoded source and this information is also passed to the channel coding block 310 to taken into account for distortion awareness during the channel encoding of the source-encoded data 314. For example, rate distortion characteristics for various codecs and source encoding of various different media types can be determined and/or observed, and passed to the channel coding block 310 by the source coding block 308 based upon the type of source coding used by source coding block 308. The rate-distortion characteristics of the source utilized at the channel coding block 310 for link adaptation purposes may also be dependent on other application and network layer functionalities, such as frame type (e.g., I-frame, P-frame or B-frame), network layer packetization and transmission framework used toward passing the compressed source from the codec to the channel encoder (e.g., in RTP/UDP), type of layering in the case of advanced source compression methods such as scalable video coding (SVC) and application-layer forward error correction FEC (e.g., raptor codes, Reed-Solomon codes, etc.).

The channel coding block 310 includes a distortion-aware time-frequency forward error correction (FEC) outer coding and interleaving block 318, followed by a distortion-aware MIMO space-time (ST) modulation block 320, which is then followed by a distortion-aware MIMO precoding block or component 322 to produce channel-encoded data 324. According to some implementations, precoding is carried out according to a precoding framework for optimal design of the precoding matrix Q, as described additionally below. Following precoding, the channel-encoded data is transmitted by multi-antenna transmission to the receiver 304 over MIMO channel 306. The MIMO space-time modulation block 320 can either operate in the MIMO diversity mode, as distortion-aware MIMO STC block 328, or in the MIMO spatial multiplexing mode as distortion-aware MIMO SM block 330. In the MIMO diversity mode, output bits of the FEC coding and interleaving block 318 are first modulated by symbol mapping in a symbol modulation block 332 at high quadrature amplitude modulation (QAM), and then re-encoded using a space-time code (STC) into multiple spatial streams at space-time coding block 334. Alternatively, in the MIMO spatial multiplexing mode, the coded/interleaved bits output from the FEC coding and interleaving block 318 are de-multiplexed into multiple spatial streams by a DEMUX block 336, and each stream is then modulated by symbol mapping in a plurality of symbol modulation blocks 338 at low QAM. The decision on whether to use the distortion-aware MIMO STC block 328, or the distortion-aware MIMO SM block 330 is dependent upon the determined distortion-aware criteria for MIMO MCS selection, as discussed herein.

At the receiver end, a space-time decoder block 340 in receiver 304 is configured to recover the transmitted source data from a noisy corrupted received version transmitted over the MIMO wireless channel, following the multi-antenna reception. The recovered data stream is passed to a source decoding block 342, which reconstructs the source with the goal of minimizing the distortion between the original source and a reconstructed source 344. For example, in the case of a multimedia source, such as an audiovisual multimedia content item (e.g., television, movie, video, or the like), the goal is to minimize distortions introduced by the encoding and decoding of the content item and the transmission of the content item over a noisy transmission channel.

The source-encoded data 314 received from the source coding block 308 is passed through the channel encoding blocks 318, 320, 322 before multi-antenna transmission. According to implementations herein, all of these radio-level channel encoder blocks 318, 320, 322 have the property of "distortion-awareness" since these radio-level channel encoder blocks 318, 320, 322 are configured to execute implementations of the distortion-aware MIMO link adaptation strategy for selected MIMO MCS scheme, packet size and precoding set forth herein. Based upon formulas discussed below link adaptation parameters 346, i.e., MIMO MCS (such as FEC code rate and MIMO space-time modulation scheme), packet size and precoding matrix Q are determined and provided to the radio-level channel encoder blocks 318, 320, 322 for implementing the distortion awareness of these blocks. Examples of determining the link adaptation parameters 346 for the open-loop implementations are described further below.

Closed-Loop Architecture

Figure 4:
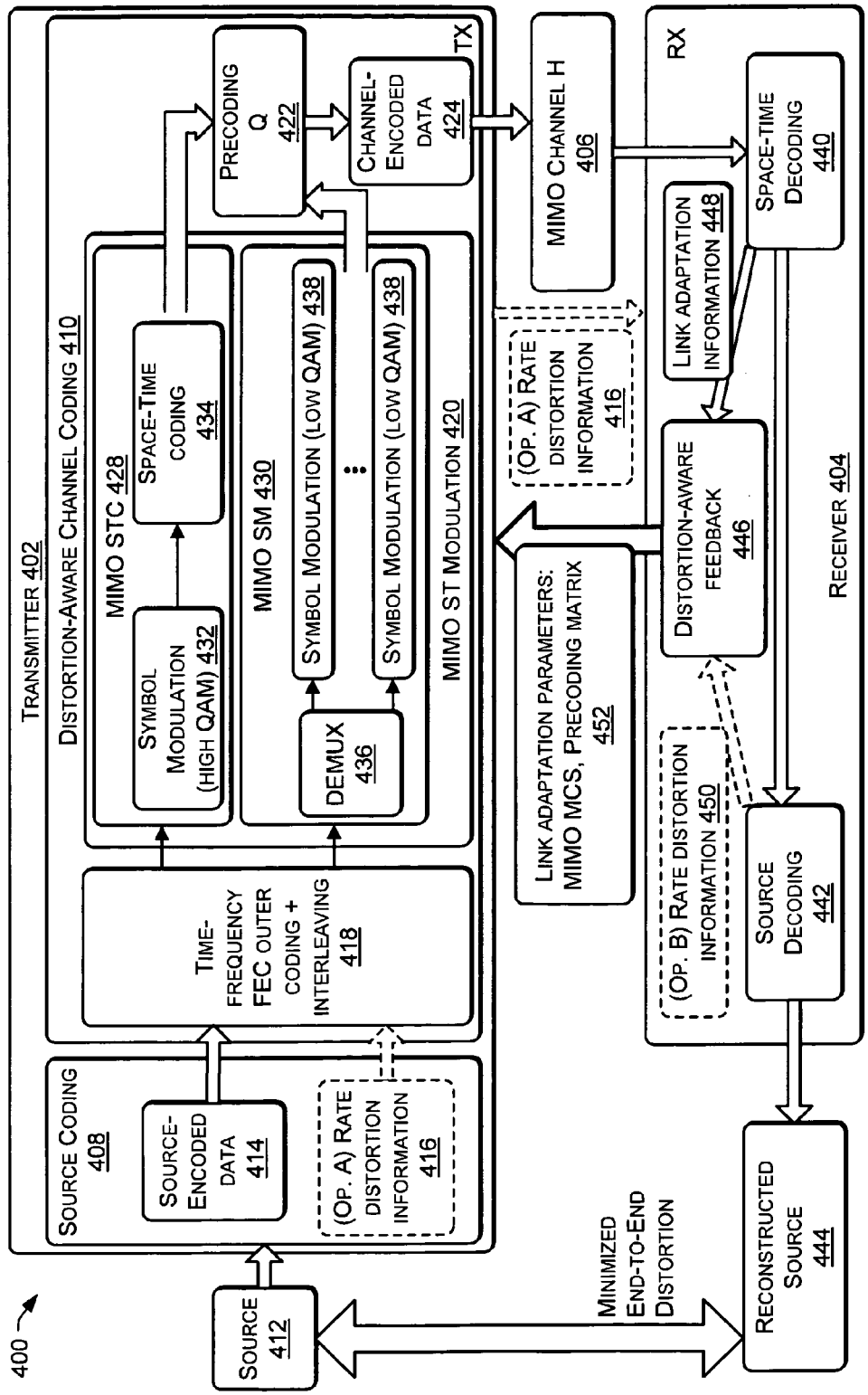
FIG. 4 depicts a block diagram of an example closed loop system according to some implementations.

FIG. 4 illustrates a block diagram of an example of a closed-loop distortion-aware MIMO link adaptation architecture 400 according to some implementations herein, in which link adaptation parameters are determined at the receiver and are fed back for application at the transmitter. In the architecture of FIG. 4, similar to that of FIG. 3 described above, a transmitter 402 is able to communicate with a receiver 404 via a MIMO channel 406. In the illustrated implementation, transmitter 402 includes a source encoder, shown as source coding block 408, and a channel encoder, shown as distortion-aware channel coding block 410. The source coding block 408 is configured to compress and otherwise encode a source 412, such as a multimedia source, and pass the source-encoded data 414 along with, in some implementations, rate-distortion information 416 of the source-encoded data 414 to the distortion-aware channel coding block 410. However, in other implementations, the source coding block 408 may not pass rate distortion information 416 to the channel coding block 410. Instead, as discussed further below, the rate distortion information may be determined directly by the receiver 404 and taken into consideration when preparing feedback that is provided to the distortion-aware channel coding block 410. Hence passing the rate distortion information 416 from the source coding block 408 is used in some implementations of the closed loop architecture, and is labeled as Option A (Op. A) in FIG. 4. Alternatively, or in addition, the rate distortion information may be determined independently at the receiver 404, which is labeled as Option B (Op. B) in FIG. 4, and which is discussed additionally below.

The channel coding block 410 includes a time-frequency forward error correction (FEC) outer coding and interleaving block 418, followed by a MIMO space-time (ST) modulation block 420, which is then followed by a MIMO precoding block or component 422. The MIMO precoding block 422 may execute precoding according to a framework for optimal design of the precoding matrix Q, as described additionally below, to produce channel-encoded data 424. The channel encoded data 424 is sent to receiver 404 over MIMO channel 406 (along with rate-distortion information 416 in the case of Op. A). Similar to the configuration discussed above with reference to FIG. 3, the MIMO ST modulation block 420 can either operate in the MIMO diversity mode as MIMO STC block 428, or in the MIMO spatial multiplexing mode as MIMO SM block 430. In the MIMO diversity mode, output bits of the channel coding and interleaving block 418 are first modulated by symbol mapping in a symbol modulation block 432 at high QAM, and then re-encoded using a space-time code (STC) into multiple spatial streams at space-time coding block 434. Alternatively, in the MIMO spatial multiplexing mode, the coded/interleaved bits output from the coding and interleaving block 418 are de-multiplexed into multiple spatial streams by a DEMUX block 436 and each stream is then modulated by symbol mapping in a plurality of symbol modulation blocks 438 at low QAM. The decision on whether to use the MIMO STC block 428, or the MIMO SM block 430 is dependent upon the determined distortion-aware criteria for MIMO MCS selection, which is provided to the distortion-aware channel coding block 410 by feedback from the receiver 404.

At the receiver 404, a space-time decoding block 440 is configured to recover the transmitted source data from a noisy corrupted received version transmitted over the MIMO wireless channel, following the multi-antenna reception. The recovered data stream is passed to a source decoding block 442, which reconstructs the source with the goal of minimizing the distortion between the original source 412 and a reconstructed source 444.

For the closed-loop distortion-aware MIMO link adaptation architecture 400 illustrated in FIG. 4, the receiver 404 also includes a distortion-aware feedback block 446 that periodically provides feedback to transmitter 402 for enabling the distortion awareness of the distortion-aware channel coding block 410. For example, the distortion-aware feedback block 446 at the receiver 404 may determine from the space-time decoding block 440 link adaptation information 448 (i.e., the estimated MIMO channel parameters, and the MIMO MCS, packet size and precoding matrix Q parameters). The distortion-aware feedback block 446 uses the link adaptation information 448 along with rate distortion information 416 (Op. A) and/or rate distortion information 450 (Op. B) to determine distortion-minimizing link adaptation parameters 452, e.g., a MIMO MCS scheme, packet size and precoding matrix Q. After the distortion-minimizing MIMO link adaptation parameters 452 have been determined at the receiver 404 based on receiver's knowledge of the long-term channel variations along with the instantaneous or statistical knowledge of short-term MIMO channel realizations, the link adaptation parameters 452 are fed back to the transmitter 402.

In addition, according to some implementations, as discussed above, when determining distortion-minimizing MIMO link adaptation parameters 452, the distortion-aware feedback block 446 may also gather the rate-distortion information 450 about the multimedia source from the source decoding block 442 (Op. B). Alternatively, or in addition, transmitter 402 may send rate-distortion information 416 on the source along with channel-encoded data 424 to receiver 404 over the MIMO channel 406 (Op. A), so that distortion-aware feedback block 446 at receiver 404 may utilize this information in determining distortion-minimizing MIMO link adaptation parameters 452. The rate distortion information 416 and/or 450 are taken into consideration by distortion-aware feedback block 446 when determining the distortion minimizing link adaptation parameters 452, e.g., MIMO MCS, packet size and precoding matrix, which are then passed to the transmitter 402 through a feedback channel. For example, transmitter 402 may be incorporated into a first device that also includes a receiver (not shown), while receiver 404 may be incorporated into a second device that also includes a transmitter (not shown), thus enabling the receiver 404 to provide feedback wirelessly to the transmitter 402 such as over MIMO channel 406, or other wireless channel, link, or the like.

Distortion-Aware Precoding Framework

Implementations herein provide a distortion-aware precoding framework for optimal design of the precoding matrix Q to enable distortion-aware link adaptation. As mentioned above, precoding is a processing technique that exploits channel state information (CSI) by operating on the signal before the signal is transmitted. For example, a precoding component according to some implementations herein may essentially function as a multimode beam former able to optimally match the input signal on one side to the channel on the other side. In some implementations, the precoding component may do this by splitting the transmit signal into orthogonal spatial eigenbeams with per-beam power allocation in which higher power is assigned along the beams where the channel is strong, but lower or no power is assigned along the beams where the channel is weak. Further, the precoding parameters may vary based on the type of statistical channel state information (CSI) available and performance criteria.

As an example, consider the transmitter to be a base station able to communicate with a plurality of mobile stations as receivers. In order to optimally perform radio resource management and link adaptation, the transmitter may learn the link qualities to each receiver, i.e., toward executing functions such as scheduling and MCS selection. To this end, channel quality indicator (CQI) feedback mechanisms may be designed, so that each receiver can periodically report its channel state information to the transmitter. Relevant CQI metrics in this context include physical signal-to-interference-and-noise ratio (SINR) (also known as carrier-to-interference-and-noise ratio (CINR)) and effective SINR (E-SINR or E-CINR), channel state information (e.g., statistical channel information, such as channel mean or channel covariance, transmit/receive correlation matrices, etc., or instantaneous channel information such as channel Demmel condition number), as well as recommendations of the receiver for a number of link adaptation modes such as MCS selection, MIMO space-time modulation mode, MIMO STC rate, packet size index and precoding matrix index (PMI). To enable a CQI feedback mechanism in the distortion-aware MIMO link adaptation system architecture, the space-time decoder at the receiving end also includes a distortion-aware feedback block 446, as illustrated in FIG. 4, which determines the link adaptation information (i.e., SINR information, statistical or instantaneous channel state information, MIMO MCS, packet size and precoding matrix) to be periodically fed back to the transmitter after the distortion-minimizing MIMO link adaptation parameters have been determined at the receiver based on receiver's knowledge of the average or long-term received SINR and instantaneous or statistical knowledge of the short-term SINR over the MIMO channel. To be used as part of this process, the distortion-aware feedback design block may gather the rate-distortion information about the multimedia source from the source decoding block 442.

In a point-to-point single-user MIMO communication system with $M_t$ transmit and $M_r$ receive antennas over a coding blocklength T, the $M_r \times T$ received signal is given by $$Y = HQS + N,$$

where H is the $M_r \times M_t$ complex random channel matrix representing the MIMO link (which remains fixed over the entire coding blocklength T), S is the M×T transmitted space-time block codeword, Q is the $M_t \times M$ linear precoding matrix ($M \le M_t$ is a precoding design parameter) such that trace $(Q^*Q') = 1$, where Q' is the Hermitian of Q, and N represents the $M_r \times T$ additive white Gaussian noise (AWGN) noise matrix where each entry has zero mean and variance $\sigma^2$. The average received signal-to-noise ratio (SNR) for the MIMO link is given by $\gamma = P/\sigma^2$, with the average transmit power constraint $(1/T)^* E[\|S\|_F^2] \le P$, where $\|A\|_F$ is the Frobenius norm of matrix A and E represents the expectation operation. The receiver has a priori the precoding matrix Q and may treat the combination HQ as an effective channel. Consequently, the normalized $M_t \times M_t$ transmit covariance matrix for the $M_t \times T$ transmitted signal (after precoding) is given by $$\Phi = Q^* \Omega^* Q', \qquad (1)$$

where the normalized codeword covariance matrix $$\Omega = \frac{1}{TP} E[SS']$$

depends on the choice of the space-time encoding method (e.g., space-time coding, spatial multiplexing, etc.). Based on equation (1), the normalized $M_r \times M_r$ receive covariance matrix $\Psi$ is then given by $$\Psi = \gamma HQ\Omega Q' H' + I = \gamma H\Phi H' + I, \qquad (2)$$

where I is the $M_r \times M_r$ identity matrix.

According to some implementations, an objective for precoding is to ensure that the transmit covariance matrix Φ has a desirable structure to optimize certain performance metrics (e.g., capacity, pair-wise error probability, symbol error rate, etc.). In that context, a linear precoding matrix Q functions as a multimode beam-former for optimally matching the input signal S on one side to the channel H on the other side. The precoding component does this by splitting the transmit signal into orthogonal spatial eigen-beams with per-beam power allocation such that the precoding component assigns higher power along the beams where the channel is strong but lower or no power along the weak. Essentially, a precoding component has two effects: (1) decoupling the input signal into orthogonal spatial modes, such as in the form of eigen-beams, and (2) allocating power over these beams, such as based on the CSI (channel state information). If the precoded, orthogonal spatial-beams match the channel eigen-directions (the eigenvectors of H'H), there will be no interference among signals sent on different modes, thus creating parallel channels and allowing transmission of independent signal streams. However, this effect uses full channel knowledge available at the transmitter. With partial CSI and statistical channel knowledge, the precoding component may approximately match the eigen-beams to the channel eigen-directions, and therefore is able to reduce the interference among signals sent on these beams. This is a decoupling effect enabled by precoding.

Moreover, the precoding component may allocate power on the beams. For example, for orthogonal eigen-beams, when all the beams have equal power, the total radiation pattern of the transmit antenna array is isotropic. Thus, through power allocation, the precoding component may effectively create a radiation shape to match to the channel based on the CSI. Consequently, higher power is sent in the directions where the channel is strong and reduced or no power is sent in the directions where the channel is weak. Accordingly, precoding according to some implementations herein may include two parts, namely, (1) beamforming directions and (2) power allocation across the beams.

Further, implementations herein provide a specific framework for the optimal design of the precoding matrix Q in order to enable distortion-aware link adaptation. One goal of the framework is to ensure that the optimal precoding matrix Q is selected such that the resulting receive covariance matrix $\Psi$ given in equation (2) minimizes average end-to-end distortion. More specifically, considering the eigen-value decomposition of the transmit covariance matrix $\Phi$ as $\Phi = U_\Phi \Lambda_\Phi U'_\Phi$, implementations may determine an optimal precoding design yielding a distortion-minimizing parameter set for the eigenvectors $U_\Phi$ (i.e., a unitary matrix representing the beamforming matrix for the orthogonal transmit beam directions) and eigen-values $\Lambda_\Phi$ (i.e., a diagonal matrix representing power allocation across these beams) for the receive covariance matrix, re-expressed as $$\Psi = \gamma H U_\Phi \Lambda_\Phi U'_\Phi H' + I. \qquad (3)$$

Implementations are able to address distortion-aware precoding techniques for long-term link adaptation, which is suitable in situations for which reliable feedback of dynamic channel variations and link adaptation parameters is generally difficult (e.g., as in high mobility or high user density scenarios). In such a setting, the distortion-aware MIMO link adaptation may be performed based on the knowledge of the long-term channel variations and statistics of the instantaneous or short-term channel variations. As part of the long-term link adaptation, availability of various types of statistical channel knowledge may be considered according to two different example CSI models, as discussed below.

Example CSI Model 1: Known Channel Mean

According to a first example CSI model, the CSI includes a known channel mean. In this example, the estimates for the channel coefficients are available subject to an estimation error. In other words, the long-term link adaptation can be performed subject to the availability of the $M_r \times M_t$ channel mean matrix $\bar{H}=E[H]$ (representing the channel estimates) such that $H=\bar{H}+\tilde{H}$, where $\tilde{H}$ contains uncorrelated independent and identically distributed (i.i.d.) circularly-symmetric complex Gaussian entries (i.e., the covariance is the identity matrix) representing the estimation error. In this setting, the long-term link adaptation can be performed based on the following rule (MIMO_MCS,P_SIZE,Q)=$f$(SINR,$\bar{H}$), where the distortion-aware MIMO link adaptation function $f$ maps the average or long-term SINR and channel mean $\bar{H}$ to a MIMO-MCS scheme, packet size P_SIZE and a precoding matrix Q.

Example CSI Model 2: Known Channel Transit and Receive Correlation Structure

According to a second example CSI model, the CSI includes a known channel transmit and receive correlation structure. In this example, the channel is assumed to be varying too fast and therefore its dynamic variations cannot be estimated, but the correlation structure of the channel can be tracked. In other words, the link adaptation can be performed subject to the availability of transmit and receive correlation matrices of the MIMO channel $W_T$ and $W_R$, of dimensions $M_t \times M_t$ and $M_r \times M_r$, respectively, such that the MIMO channel matrix H can be represented as $H=W_R^{1/2}H_w W_T^{1/2}$, where the $M_r \times M_t$ complex random channel matrix $H_w$ contains the uncorrelated i.i.d. channel coefficients. In this setting, the long-term link adaptation can be performed subject to the following rule (MIMO_MCS,P_SIZE,Q)=$f$(SINR,$W_T$,$W_R$), where the distortion-aware MIMO link adaptation function $f$ maps the average or long-term SINR and channel correlation matrices $W_T$ and $W_R$ to a MIMO-MCS scheme, packet size and a precoding matrix Q. In general, the long-term link adaptation may account for all of channel mean $\bar{H}$ and correlation matrices $W_T$ and $W_R$ to determine the MIMO-MCS scheme, packet size and precoding matrix Q and therefore corresponds to the mapping (MIMO_MCS,P_SIZE,Q)=$f$(SINR,$\bar{H}$,$W_T$,$W_R$).

Design Criteria for Distortion-Aware Precoding

Subject to availability of statistical channel knowledge specified by the various statistical CSI models above (and/or other CSI models based on statistical channel knowledge), a general criterion for selecting an optimal precoding matrix that minimizes end-to-end distortion may be given by $$(\text{MIMO\_MCS}_{SELECTED}, \text{P\_SIZE}_{SELECTED}, Q_{SELECTED}) = \min_{R,P\_SIZE,Q} D_{ave}(R, \text{P\_SIZE}, Q, SINR, \bar{H}, W_T, W_R), \quad (4)$$

subject to trace$(Q*Q') = 1$ with $$D_{ave} = E_H[D(b*R)*(1 - PER(R, \text{P\_SIZE}, Q, SINR, \bar{H}, W_T, W_R)) + D_{max}*PER(R, \text{P\_SIZE}, Q, SINR, \bar{H}, W_T, W_R)] \quad (5)$$

where R is the space-time transmission rate at the channel coder determined by the selected MIMO-MCS scheme (e.g., including FEC type and code rate, modulation order, MIMO space-time modulation scheme) and PER is the packet error rate (PER) determined by the average or long term received signal-to-interference and noise ratio (SINR), statistical knowledge of the short-term SINR over the MIMO channel represented by channel mean $\bar{H}$ and correlation matrices $W_T$ and $W_R$, data rate for the selected MIMO MCS, selected packet size and selected precoding matrix Q. By determining average end-to-end distortion, $D_{ave}$, for the parameters above, the precoding can be used to minimize the end-to-end distortion.

Distortion-Aware Precoding Scheme for Example CSI Model 1

Returning to the example CSI model 1 discussed above, selection criteria for distortion-aware precoding design for this example CSI model is now described. This enables determination of optimal precoding designs yielding the distortion-minimizing parameter set for the eigen-vectors $U_\Phi$ (i.e., for transmit beam directions), and eigen-values $\Lambda_\Phi$ (i.e., for power allocation across beams). In this example, the singular-value decomposition of the channel mean $\bar{H}$ may be $\bar{H}=U_{\bar{H}}\Sigma_{\bar{H}}V'_{\bar{H}}$. Then the optimal precoding beam directions to minimize end-to-end distortion would be obtained from the right singular vectors of $\bar{H}$, and are given by $U_\Phi=V_{\bar{H}}$ (these directions are also the eigen-vectors of $\bar{H}'\bar{H}$) such that the channel mean eigen-directions become the statistically preferred directions. Consequently, the optimal receive covariance matrix in equation (3) can be expressed for this case as $$\Psi_{CSIT-1}=\gamma(\Sigma_{\bar{H}}+\tilde{H})\Lambda_\Phi(\Sigma_{\bar{H}}+\tilde{H})+I, \text{trace}(\Lambda_\Phi)=1.$$

The remaining task is to select the set of eigen-values $\Lambda_\Phi$ by using the general distortion-minimizing criterion of equation (4). More specifically, the selection criterion in equation (4) for this case can be expressed as $$(\text{MIMO\_MCS}^{opt}, \text{P\_SIZE}^{opt}, \Lambda_\Phi^{opt}) = \min_{R,P\_SIZE,\Lambda_\Phi} D_{ave}(R, \text{P\_SIZE}, \Lambda_\Phi, SINR, \Psi_{CSIT-1}) \quad (6)$$

subject to trace$(\Lambda_\Phi) = 1$ with $$D_{ave} = E_H[D(b*R)*(1 - PER(R, \text{P\_SIZE}, \Lambda_\Phi, SINR, \Psi_{CSIT-1})) + D_{max}*PER(R, \text{P\_SIZE}, \Lambda_\Phi, SINR, \Psi_{CSIT-1})] \quad (7)$$

Additionally, while the selection of the beamforming matrix $U_\Phi$ for the distortion-aware precoding scheme for example CSI model 1 may be identical to design optimizations with respect to many other performance metrics (e.g., capacity, pair-wise error probability, etc.), the distortion-minimizing power allocation given by the set of eigen values $\Lambda_\Phi$ may be quite different from the classical approaches.

Distortion-Aware Precoding Scheme for Example CSI Model 2

Returning to the example CSI model 2 discussed above, the eigen-value decompositions of the transmit correlation matrix $W_T$ may be $W_T=U_T\Lambda_T U'_T$ and for the receive correlation matrix $W_R$ may be $W_R=U_R\Lambda_R U'_R$. Then the optimal precoding beam directions to minimize end-to-end distortion would be obtained from the eigen-vectors of the transmit correlation matrix, i.e., eigen-vectors of $W_T$, and which are given by $U_\Phi=U_T$ such that the correlation among the transmit antennas may dictate the statistically preferred beam directions. Consequently, an optimal receive covariance matrix in equation (3) can be expressed for this case as $$\Psi_{CSIT-2}=\gamma(\Lambda_R^{1/2}H_w\Lambda_T^{1/2})\Lambda_\Phi(\Lambda_T^{1/2}H'_w\Lambda_R^{1/2})+I, \text{trace}(\Lambda_\Phi)=1.$$

This expression can be further simplified as $$\Psi_{CSIT-2} = \gamma\sum_{m=1}^{M_t} \lambda_m^{(T)}\lambda_m^{(\Phi)}\vec{h}_m\vec{h}'_m + I,$$

$$\sum_{m=1}^{M} \lambda_m^{(\Phi)} = 1$$

where $\lambda_m^{(T)}$ is the m-th diagonal entry of $\Lambda_T$ (i.e., m-th eigenvalue of $W_T$), $\lambda_m^{(\Phi)}$ is the m-th diagonal entry of $\Lambda_\Phi$, and $\vec{h}_m$ is the $M_r \times 1$ column vector given by (m=1, ..., $M_t$) such that $$\vec{h}_m = \begin{bmatrix} \sqrt{\lambda_1^{(R)}} d_{1,m} \\ \sqrt{\lambda_2^{(R)}} d_{2,m} \\ \vdots \\ \vdots \\ \sqrt{\lambda_{M_r}^{(R)}} d_{M_r,m} \end{bmatrix}$$

where $\lambda_n^{(R)}$ is the n-th diagonal entry of $\Lambda_R$ (i.e., n-th eigenvalue of $W_R$), and $d_{n,m}$ is the entry in the n-th row and m-th column of matrix $H_w$ (n=1, ..., $M_r$).

The remaining task is to select a set of eigen-values $\Lambda_\Phi$ by using the general distortion-minimizing criterion of equation (4). More specifically, the selection criterion in equation (4) may be expressed for this case as $$(\text{MIMO\_MCS}^{opt}, \text{P\_SIZE}^{opt}, \Lambda_\Phi^{opt}) = \quad (8)$$
$$\min_{R, P\_SIZE, \Lambda_\Phi} D_{ave}(R, \text{P\_SIZE}, \Lambda_\Phi, SINR, \Psi_{CSIT-2})$$

subject to trace($\Lambda_\Phi$) = 1 with $$D_{ave} = E_H[D(b*R)*(1 - PER(R, \text{P\_SIZE}, \Lambda_\Phi, SINR, \Psi_{CSIT-2})) + \quad (9)$$
$$D_{max} * PER(R, \text{P\_SIZE}, \Lambda_\Phi, SINR, \Psi_{CSIT-2})]$$

Further, while the selection of the beamforming matrix $U_\Phi$ for the distortion-aware precoding scheme for example CSI model 2 may be identical to design optimizations with respect to many other performance metrics (e.g., capacity, pair-wise error probability, etc.), the distortion-minimizing power allocation given by the set of eigen values $\Lambda_\Phi$ may be quite different from these classical approaches. Moreover, while the optimal beam directions for distortion-aware precoding may be independent of the receive correlation matrix, and determined by the transmit correlation matrix, the power allocation across these beams can be a function of both transmit and receive antenna correlation matrices.

Example Open-Loop Process

Figure 5:
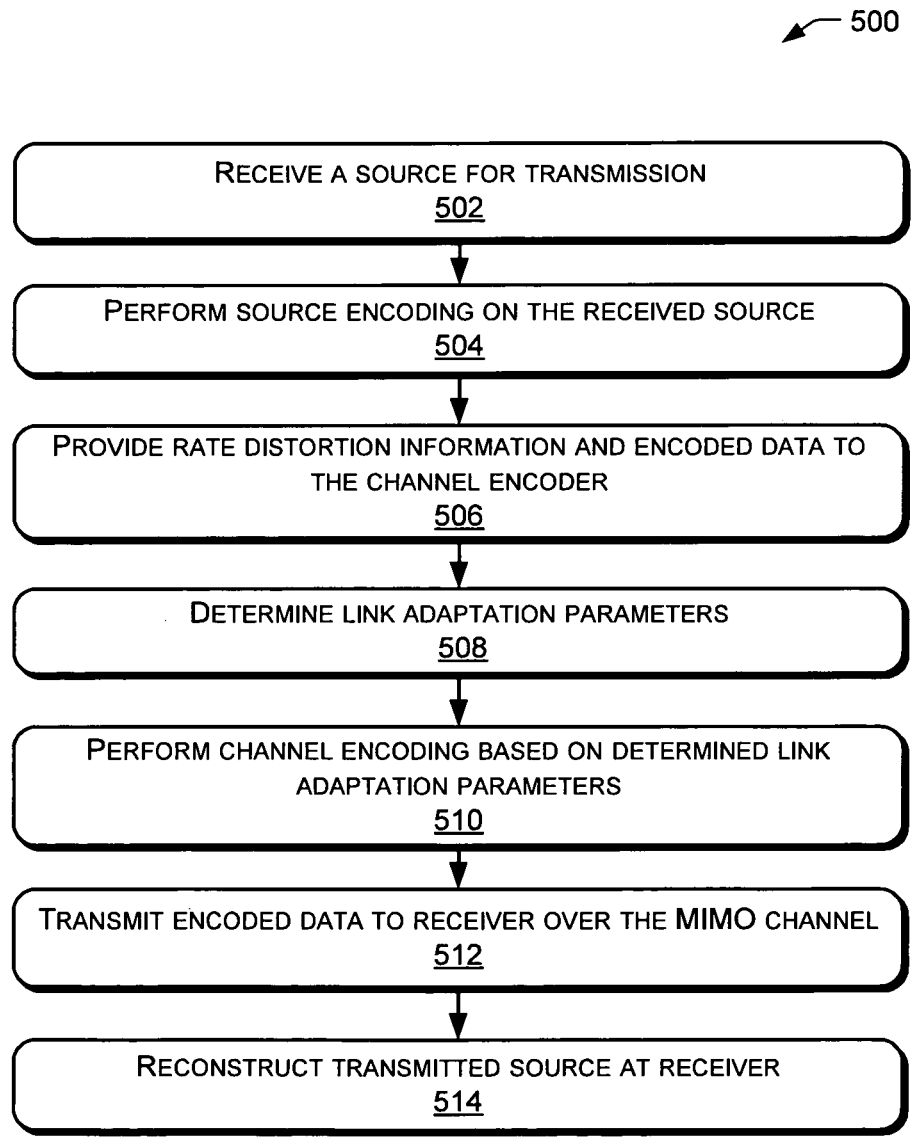
FIG. 5 depicts a flow diagram of an example process for open-loop distortion-aware communications according to some implementations.

FIG. 5 illustrates a flow diagram of an example open loop process 500 for distortion-aware link adaptation according to some implementations herein. In the flow diagram, the operations are summarized in individual blocks. The operations may be performed in hardware, or as processor-executable instructions (software or firmware) that may be executed by a processor. Further, the process 500 may, but need not necessarily, be implemented using the system of FIG. 3. Consequently, by way of explanation, and not limitation, the process 500 is described in the context of the system of FIG. 3.

At block 502, a source for transmission is provided to a transmitter. For example, as discussed above, the source may be a multimedia communication, including voice over IP, speech and audio communications, mobile TV, mobile video services, or the like.

At block 504, source encoding of the source is performed by a source encoder of the transmitter. For example, as discussed above, the source may be compressed or otherwise encoded in preparation for transmission.

At block 506, the source-encoded data and corresponding rate distortion information are provided to the channel encoder of the transmitter. For example, the rate distortion information may be based upon the type of source encoding performed on the source, and may include known statistical or observed data.

Figure 7:
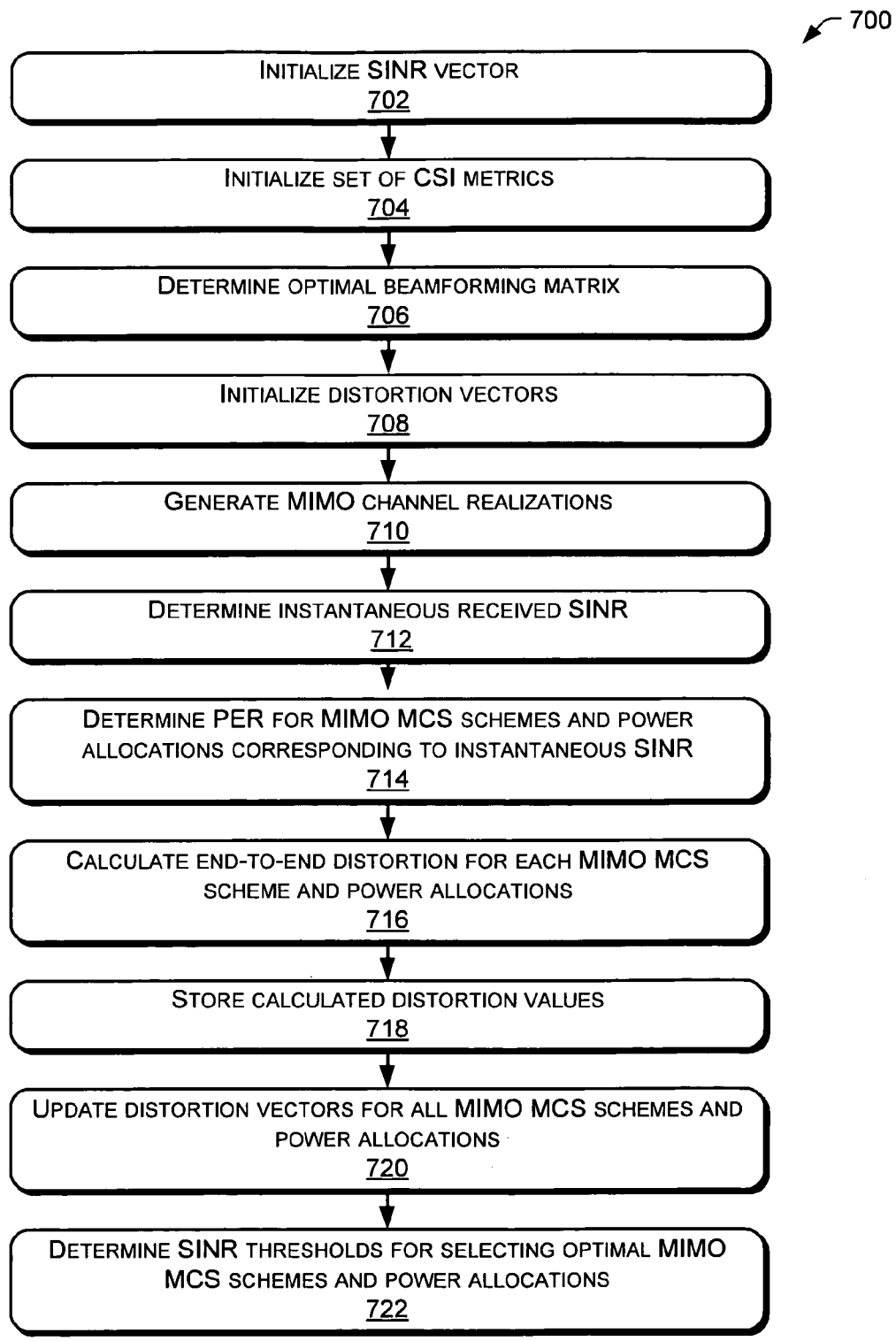
FIG. 7 depicts a flow diagram of an example process for determining link adaptation parameters according to some implementations.

At block 508, the link adaptation parameters (e.g., the MIMO MCS scheme, packet size and precoding matrix) are determined for the distortion-aware channel encoder. For example, link adaptation parameters may include FEC code rate and MIMO space-time modulation for the MIMO MCS scheme, packet size and the precoding matrix Q determined based upon the received rate distortion information and statistical information stored at the transmitter for access by the channel encoder. Further, a lookup table or other stored information based upon known statistics (such as SNR values and distortion vectors) of the channel being used may be provided for determining optimal link adaptation parameters for minimizing end-to-end distortion. FIG. 7 and the corresponding description set forth below provide an example of determining the distortion minimizing link adaptation MCS, packet size and precoding parameters according to some implementations herein.

At block 510, channel encoding of the source-encoded data is performed based on the selected link adaptation parameters to produce channel-encoded data.

At block 512, the channel-encoded data is transmitted to the receiver over the MIMO channel.

At block 514, the transmitted encoded data is reconstructed at the receiver to provide a reconstructed source with minimized distortion.

Example Closed-Loop Process

Figure 6:
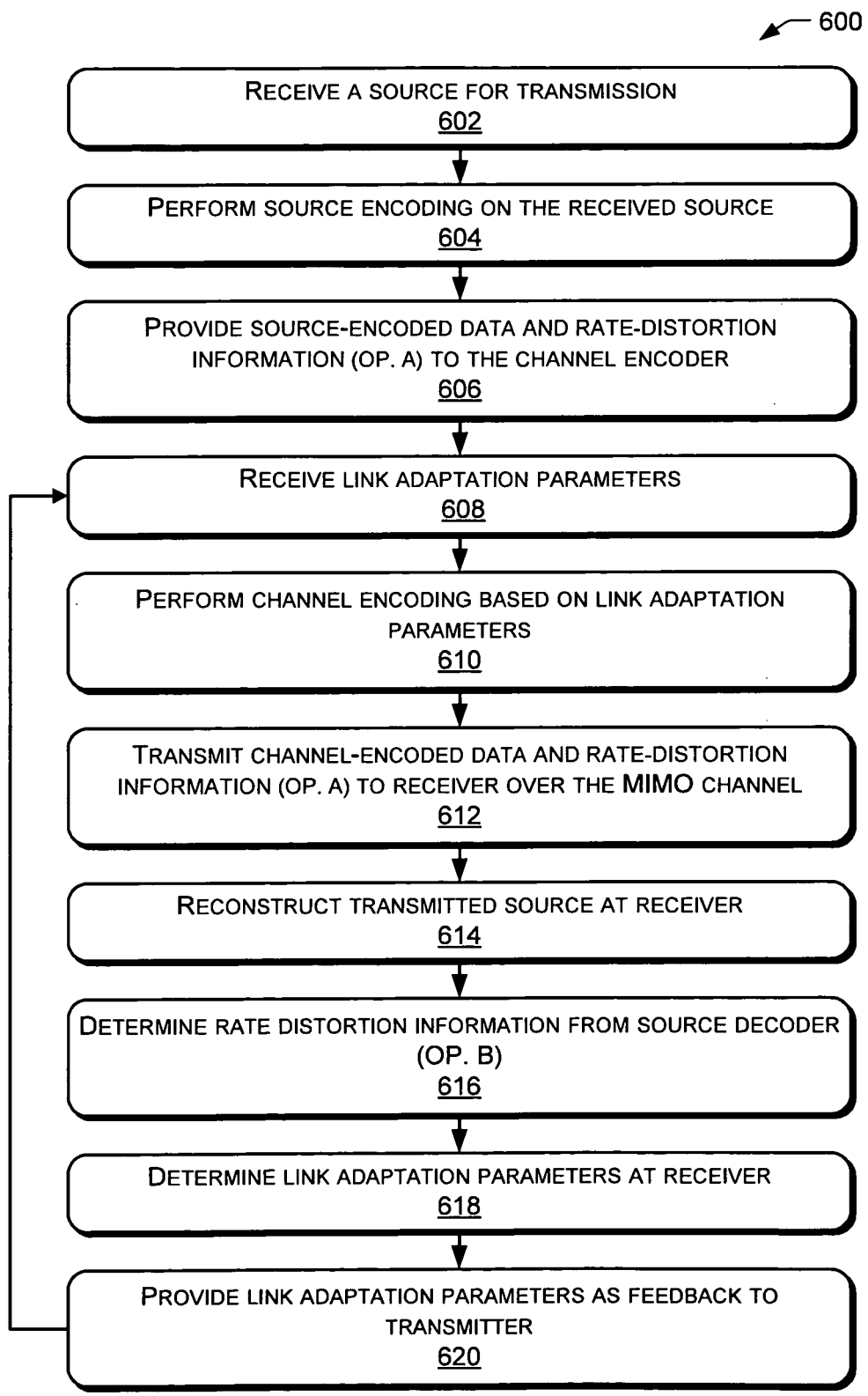
FIG. 6 depicts a flow diagram of an example process for closed-loop distortion-aware communications according to some implementations.

FIG. 6 illustrates a flow diagram of an example closed-loop process 600 for distortion-aware link adaptation according to some implementations herein. In the flow diagram, the operations are summarized in individual blocks. The operations may be performed in hardware, or as processor-executable instructions (software or firmware) that may be executed by a processor. Further, the process 600 may, but need not necessarily, be implemented using the system of FIG. 4. Consequently, by way of explanation, and not limitation, the process 600 is described in the context of the system of FIG. 4.

At block 602, a source for transmission is provided to the transmitter of the wireless communications device.

At block 604, source encoding of the source data is performed by a source encoder of the transmitter. For example, as discussed above, the source data may be compressed or otherwise encoded in preparation for transmission.

At block 606, the encoded source data (and corresponding rate distortion information in the case of Op. A, as described in FIG. 4) are provided to the channel encoder of the transmitter.

At block 608, the link adaptation parameters are received by the distortion-aware channel encoder. For example, link adaptation parameters may include a selected MIMO MCS scheme, packet size and precoding matrix determined by the receiver and provided as feedback. FIG. 7 and the corresponding description set forth below provide an example of how the receiver determines the distortion minimizing link adaptation parameters for closed-loop distortion-aware link adaptation according to some implementations herein. For example, based on received communications, the receiver can possess reliable and accurate knowledge on the instantaneous or short-term MIMO channel realizations, which holds for typical communication scenarios since the wireless channel variations are slow enough to allow for reliable channel estimation and feedback of link adaptation parameters (e.g., as in low mobility scenarios). Alternatively, the distortion-aware MIMO link adaptation at the receiver may also be based on the knowledge of the long-term channel variations and the statistical knowledge of the instantaneous or short-term MIMO channel realizations. In that case, FIG. 7 and the corresponding description set forth below may provide another example of how the receiver may determine the distortion minimizing link adaptation parameters for closed-loop distortion-aware link adaptation according to some implementations herein, such as when the receiver cannot reliably estimate the dynamic variations of the MIMO channel (e.g., as in high mobility scenarios), and therefore the distortion-aware MIMO link adaptation at the receiver would be based on the knowledge of the long-term channel variations and the statistical knowledge of the instantaneous or short-term MIMO channel realizations. Thus, in these alternative implementations, the receiver can determine the link adaptation parameters according to the description of FIG. 6 and provide the determined link adaptation parameters as feedback to the transmitter.

At block 610, channel encoding of the source-encoded data is performed based on the MIMO-MCS method and packet size selected and the precoding matrix received from the receiver to produce channel-encoded data. Furthermore, if feedback has not yet been received, or if feedback is not received for some other reason, the channel encoder at the transmitter may apply a default MIMO MCS scheme, packet size and precoding matrix. Alternatively, the channel encoder may apply the open-loop implementation described above until feedback is received.

At block 612, the channel-encoded data (and rate-distortion information on the source in the case of Op. A, as described in FIG. 4) are transmitted to the receiver over the MIMO channel.

At block 614, the transmitted encoded data is reconstructed at the receiver to provide a reconstructed source.

Block 616, (in the case of Op. B, as described in FIG. 4) a feedback component at the receiver determines the rate distortion information from the source decoder.

At block 618, the feedback component also determines the optimal MIMO MCS scheme, packet size and precoding matrix. FIG. 7 provides an example of determining the optimal MIMO MCS scheme, packet size and precoding matrix for minimizing overall end-to-end distortion.

At block 620, the link adaptation parameters, e.g., the optimal MIMO MCS scheme, packet size and precoding matrix are provided to the transmitter as feedback.

Process for Distortion-Aware Precoding

FIG. 7 illustrates a flow diagram of an example process 700 for distortion-aware precoding to minimize end-to-end distortion in a MIMO system according to some implementations herein. In the flow diagram, the operations are summarized in individual blocks. The operations may be performed in hardware, or as processor-executable instructions (software or firmware) that may be executed by a processor. Further, the process 700 may, but need not necessarily, be implemented using the systems of FIGS. 3 and 4. Consequently, by way of explanation, and not limitation, the process 700 is described in the context of the systems of FIGS. 3 and 4.

At block 702, the SINR vector is initialized by the channel encoder. For example, each entry is an average received SINR value and represents the long-term channel state information available at the transmitter.

At block 704, a set of CSI metrics is initialized for the statistical information on the channel states. In some implementations, the example CSI models 1 or 2 discussed above may be used for initializing the CSI metrics. In these cases, the relevant metrics may be the channel mean (e.g., example CSI model 1) and/or transmit/receive correlation matrices (e.g., example CSI model 2).

At block 706, the optimal beamforming matrix is determined for the CSI metric of interest. For example, if the channel correlation structure is known, then the optimal precoding beam directions may be obtained from the eigen-vectors of the transmit correlation matrix, i.e., eigen-vectors of $W_T$, as discussed above.

At block 708, distortion vectors are initialized for all MIMO MCS schemes, packet sizes and power allocations (i.e., across the beams). For example, each distortion vector may store distortion values at different SINRs and different power allocations (across beams).

At block 710, for iterations over all SINR values and for a large number of iterations over channel realizations, the MIMO channel realization H is randomly generated as described above.

At block 712, the instantaneous received SINR for all MIMO MCS schemes, packet sizes and power allocations (across beams) is determined for each SINR value and MIMO channel realization using the optimal beamforming matrix corresponding to the considered CSI metric.

At block 714, the PER for all MIMO MCS schemes, packet sizes and power allocations (across beams) is determined from the instantaneous received SINR (accounting for FEC type and code rates, differences among various MIMO space-time modulations (e.g., STC vs. SM), and also accounting for orthogonal frequency-division multiplexing (OFDM) modulation, such as by using physical layer (PHY) abstraction methodologies).

At block 716, for each MIMO MCS, packet size and power allocation (across beams), the end-to-end distortion is calculated based on equation (5) using the PER derived from the instantaneous received SINR in block 714. For instance, when example CSI model 1 is assumed, then equation (7) is used to calculate the end-to-end distortion for each MIMO MCS, packet size and power allocation. On the other hand, when example CSI model 2 is assumed then equation (9) is used to calculate the end-to-end distortion for each MIMO MCS, packet size and power allocation.

At block 718, the calculated distortion values (i.e., $D_{ave}$) are stored for all MIMO MCS schemes, packet sizes, power allocations (across beams) and random channel realizations.

At block 720, blocks 710-718 are repeated for each SINR value until the large number of iterations over channel realizations have been completed and the distortion vectors are updated for all MIMO MCS schemes, packet sizes and power allocations (across beams). In particular, the entry of each vector corresponding to the particular SINR value is updated with the mean distortion value (i.e., averaged over the random channel realizations).

At block 722, when blocks 710-720 have been completed for iterations over all SINRs, then, based on the distortion vectors for all MIMO MCS schemes, packet sizes and power allocations (across beams), the SINR thresholds are determined for switching between different MIMO MCS schemes, packet sizes and optimal power allocations (across beams) for each SINR value using the criterion in equation (4) so that the average end-to-end distortion is minimized at any SINR. When example CSI model 1 is assumed, then the criterion in equations (6) and (7) may be used to determine optimal MIMO MCS, packet size and power allocation. When example CSI model 2 is assumed, the criterion in equations (8) and (9) may be used to determine optimal MIMO MCS, packet size and power allocation. An optimal MIMO MCS scheme, packet size and precoding matrix Q can then be specified for a particular SINR based on known channel state information. As discussed above in the examples of FIGS. 3-6, the channel encoder space-time modulation component 320, 420 can apply the MIMO MCS scheme, packet size and the precoding component 322, 422 can apply the optimal precoding matrix during channel encoding of the source content being transmitted to the receiver.

The above precoding design criteria may be employed in conjunction with any distortion-rate function, and implementations herein also encompass any method for incorporating distortion criteria in the selection of a precoding matrix. In this context, the selection of the precoding matrix may include (i) beamforming to convert a MIMO channel into an equivalent single-input single-output (SISO) channel, (ii) precoded spatial multiplexing, (iii) precoded orthogonal space-time block coding (OSTBCs), (iv) transmit power allocation and covariance optimization across space, time and frequency, and (v) transmit antenna selection techniques where M out of $M_t$ transmit antennas are selected for transmission.

In addition, implementations herein also encompass all link adaptation and precoding techniques toward optimizing objective distortion metrics such as peak SNR (PSNR) and subjective distortion metrics that account for human visual perception and more precisely quantify a user's perceived multimedia quality of experience (QoE), such as video quality metrics (VQM), structural similarity metrics (SSIM) and perceptual evaluation of video quality (PEVQ) metrics. Hence, the scope of this disclosure and associated rate-distortion characteristics under consideration for MIMO link adaptation and precoding are based on the broader definition of distortion to cover all objective and subjective multimedia quality metrics, tracked and specified for different source and channel coding rates. Moreover, overall multimedia distortion may be a function of PSNR, error-rate performance, and could be codec dependent and packet dependent (e.g., I-frames, P-frames, B-frames, etc.), including specific cost impacts of errors on specific types of compressed packets.

Applications

Implementations herein provide "distortion-awareness" and associated joint source-channel coding ideas to support link adaptation over MIMO systems, where "distortion awareness" indicates that encoding parameters are optimized to reduce distortion in transmitted content. All of the MIMO link adaptation blocks at the transmitter and receiver, including MIMO space-time modulation, packet size selection, MIMO precoding, FEC outer coding and interleaving and feedback blocks are impacted and operate differently under implementations of the distortion-aware MIMO link adaptation framework herein. Furthermore, implementations herein may provide distortion-aware MIMO link adaptation techniques that are applicable in conjunction with any of unicast (i.e., one streaming connection established per user), broadcast (i.e., one streaming connection established per service content) and multicast transmission techniques (i.e., one streaming connection established per a selected group of users).

One example of an application according to some implementations of the distortion-aware MIMO link adaptation techniques in this context may be multicast broadcast services (MBS) in the WiMAX 802.16 standard discussed above, also known as multimedia broadcast and multicast services (MBMS) in the standards developed by the Third Generation Partnership Project (3GPP) and BroadCast and MultiCast Service (BCMCS) in standards developed by 3GPP2 (Third Generation Partnership Project 2). For instance, in the context of MBS, conventional link adaptation approaches that aim to maximize goodput typically determine the multimedia transmission rate so that a certain percentage (e.g., 95%) of the users in the network can reliably (e.g., with PER at 1% or lower) receive the multimedia transmission. However, according to some implementations herein, the distortion-aware link adaptation protocols can instead determine the multimedia transmission rate and the associated level of multimedia reception quality (measured in terms of PSNR or average end-to-end distortion) so that a certain percentage (e.g., 95%) of the users in the network can be guaranteed multimedia service with a particular quality of experience (i.e., PSNR or average end-to-end distortion below a predetermined threshold).

Example System

FIG. 8 illustrates an example of a system 800 for minimizing end-to-end distortion using distortion-aware MIMO link adaptation according to some implementations. To this end, the system 800 includes a transmitter 802 configured to communicate wirelessly with a receiver 804 over a MIMO channel 806. Transmitter 802 includes a plurality of transmitter antennas 808 for MIMO communication with a plurality of receiver antennas 810 at receiver 804. Transmitter 802 also includes a transmitter circuit or device 812, such as a radio front end or other wireless transmission mechanism for transmitting signals over the MIMO channel 806. Similarly, receiver 804 may include a receiver circuit or device 814, such as a radio front end or other wireless receiving mechanism for receiving the signals from transmitter 802. In addition, transmitter 802 may include one or more processors 816 coupled to a memory 818 or other processor-readable storage media. For example, memory 818 may contain a distortion awareness component 820 able to be executed by the one or more processors 816 to cause transmitter 802 to carry out the functions described above for minimizing end-to-end distortion. Similarly, receiver 804 may include one or more processors 822 coupled to a memory 824 or other processor-readable storage media. Memory 824 may contain a distortion awareness component 826 able to be executed by the one or more processors 822 to cause receiver 804 to carry out the functions described above for minimizing end-to-end distortion, such as providing feedback during the closed-loop implementations.

In some implementations, the processor(s) 816, 822 can be a single processing unit or a number of processing units, all of which may include multiple computing units or multiple cores. The processor(s) 816, 822 may be implemented as one or more microprocessors, microcomputers, microcontrollers, digital signal processors, central processing units, state machines, logic circuitries, and/or any devices that manipulate signals based on operational instructions. Among other capabilities, the processors 816, 822 can be configured to fetch and execute processor-executable instructions stored in the memories 818, 824, respectively, or other processor-readable storage media.

The memories 818, 824 can include any processor-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks, other non-transitory storage media, or the like, or any combination thereof. The memories 818, 824 store computer-readable processor-executable program instructions as computer program code that can be executed by the processors 816, 822, respectively, as a particular machine for carrying out the methods and functions described in the implementations herein. Further, memories 818, 824 may also include other program modules stored therein and executable by processor(s) 818, 822, respectively, for carrying out implementations herein, such codecs, or the like. For example, memory 818 may include a source encoder 828 and a channel encoder 830, as discussed above. Channel encoder may include a space-time modulation component 832 and a precoding component 834 implemented by processor 816 to perform ST modulation and precoding, respectively, according to the framework for optimal design of the precoding matrix, as described above. The distortion awareness component 820 may be incorporated into the channel encoder 830, or may be embodied as a separate component. Further, memory 824 on receiver 804 may include a source decoder 836 and a space-time decoder 838, for executing the functions discussed above. Memories 818, 824 may also include data structures, such as stored SNR vectors, lookup tables, default MIMO MCS schemes, packet sizes and precoding matrices, and the like (not shown), as discussed above.

Additionally, transmitter 802 and receiver 804 may be implemented in a variety of devices and systems, such as cellular communications systems, Wi-Fi systems, or the like. For example, transmitter 802 might be incorporated in a mobile computing device, such as a cell phone, smart phone, laptop or the like, while receiver 804 might be implemented in a cell tower, wireless access point, a second computing device, or the like, or vice versa. Further, while example system architectures have been described, it will be appreciated that other implementations are not limited to the particular system architectures described herein. For example the techniques and architectures described herein may in incorporated in any of a variety of wireless communication devices, and implementations herein are not limited to any type of communication devices.

CONCLUSION

Although the subject matter has been described in language specific to structural features and/or methodological acts, this disclosure is intended to cover any and all adaptations or variations of the disclosed implementations, and the following claims should not be construed to limit this patent to the specific implementations disclosed in the specification. Instead, the scope of this document is to be determined entirely by the following claims, along with the full range of equivalents to which such claims are entitled.

The invention claimed is:

1. A method comprising:
    selecting, by a processor, a precoding matrix to use for precoding of a source, the precoding matrix being selected based on considerations for minimizing distortion between the source and a reconstructed source induced by transmission of the source over a multiple input multiple output (MIMO) channel; and
    performing precoding on the source using the selected precoding matrix to provide channel-encoded data for transmitting the source over the MIMO channel.

2. The method according to claim 1, further comprising selecting the precoding matrix based on channel state information for the MIMO channel.

3. The method according to claim 1, the selecting the precoding matrix further comprising selecting a beamforming matrix for orthogonal transmit beam directions and power allocations across corresponding beams based on distortion minimizing considerations.

4. The method according to claim 1, the selecting the precoding matrix further comprising selecting a beamforming matrix and power allocations across corresponding beams based on at least one channel state information metric comprising:
    a known channel mean; or
    a known channel correlation structure.

5. The method according to claim 1, the selecting the precoding matrix further comprising determining optimal distortion minimizing criteria when selecting precoding parameters for at least one of:
    beamforming to convert a MIMO channel into an equivalent single-input single-output channel;
    precoded spatial multiplexing;
    precoded orthogonal space-time block coding;
    transmit power allocation and covariance optimization; or
    transmit antenna selection techniques.

6. The method according to claim 1, further comprising selecting a MIMO modulation and coding scheme and packet size for minimizing the distortion induced by transmission of the source over the MIMO channel.

7. The method according to claim 6, the selecting the MIMO modulation and coding scheme further comprising at least one of:
    selection of the modulation order;
    selection of the forward error correction type and coding rate; or
    determination of space-time modulation techniques to be used.

8. The method according to claim 1, wherein the precoding matrix is received by a transmitter performing the precoding, the precoding matrix being received as feedback from a receiver receiving data from the transmitter, the precoding matrix having been selected by the receiver.

9. The method according to claim 8, wherein the receiver also determines a MIMO modulation and coding scheme and packet size that is sent as feedback by the receiver to the transmitter.

10. Non-transitory processor-readable storage media containing processor-executable instructions to be executed by a processor for carrying out the method according to claim 1.

11. A system comprising:
    a transmitter having a processor to implement a channel encoder for encoding a source for transmission over a multiple input multiple output (MIMO) channel; and
    a precoding component that precodes the source using a precoding matrix selected to minimize distortion between the source and a reconstructed source induced by transmission of the source over the MIMO channel.

12. The system according to claim 11, wherein the precoding matrix is selected by selecting a beamforming matrix and power allocations across corresponding beams based on at least one channel state information metric comprising:
    a known channel mean, or
    a known channel correlation structure.

13. The system according to claim 11, wherein the precoding matrix is selected based on an end-to-end distortion calculated using a packet error rate derived from a signal-and-interference-noise ratio for a realization of the MIMO channel.

14. The system according to claim 11, further comprising a space-time modulation component that performs modulation and coding of the source prior to the precoding using a MIMO modulation and coding scheme and packet size selected to minimize distortion based upon channel state information.

15. The system according to claim 11, wherein
selection of the precoding matrix is performed by a receiver in communication with the transmitter; and
the transmitter receives the selected precoding matrix as feedback from the receiver.

16. The system according to claim 11, wherein
the source is a continuous multimedia source to be transmitted to a receiver to provide a reconstructed source at the receiver; and
the precoding matrix selected to minimize distortion is selected based on a determined average end-to-end distortion between the source and the reconstructed source.

17. Non-transitory processor-readable storage media comprising processor-executable instructions to be executed by a processor for implementing operations comprising:
determining a precoding matrix for transmitting a source over a multiple input multiple output (MIMO) channel, the precoding matrix being determined based on a calculated distortion between the source and a transmitted reconstructed source; and
performing precoding of the source using the precoding matrix.

18. The non-transitory processor-readable storage media according to claim 17, the determining the precoding matrix further comprising selecting a beamforming matrix and power allocations across corresponding beams based on at least one channel state information metric comprising:
a known channel mean; or
a known channel correlation structure.

19. The non-transitory processor-readable storage media according to claim 18, the selecting the power allocations across corresponding beams being based on eigen values determined from eigen vectors for transmit beam directions of the beamforming matrix.

20. The non-transitory processor-readable storage media according to claim 17, the operations further comprising determining a MIMO modulation and coding scheme (MCS) and packet size, the MIMO MCS, packet size and precoding matrix being determined by:
determining an optimal beamforming matrix based on a channel state information metric;
determining instantaneous received signal-and-interference-to-noise ratios for a plurality of MIMO MCS schemes, packet sizes and power allocations for a plurality of MIMO channel realizations;
determining a packet error rate for the plurality of MIMO MCS schemes, packet sizes and power allocations;
calculating average end-to-end distortion values for the MIMO MCS schemes, packet sizes and power allocations based on the packet error rates; and
selecting a MIMO MCS scheme, packet size and power allocation that minimizes the end-to-end distortion based on the calculated average end-to-end distortion values.

* * * * *